Jan. 24, 1961  E. FERMI ET AL  2,969,307
METHOD OF TESTING THERMAL NEUTRON
FISSIONABLE MATERIAL FOR PURITY
Filed Nov. 21, 1945
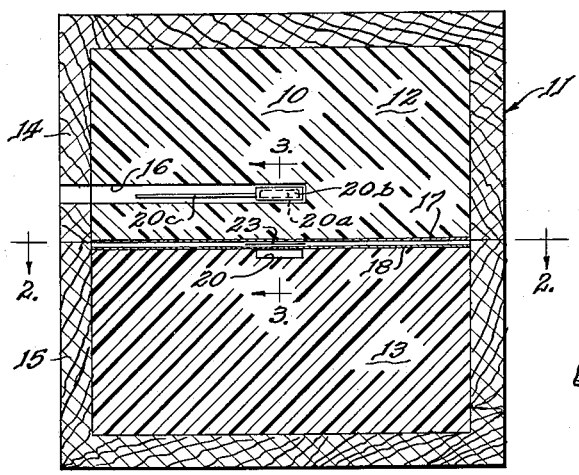
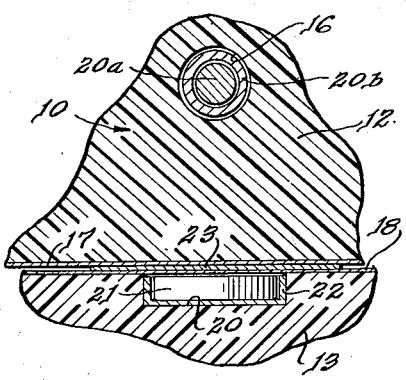
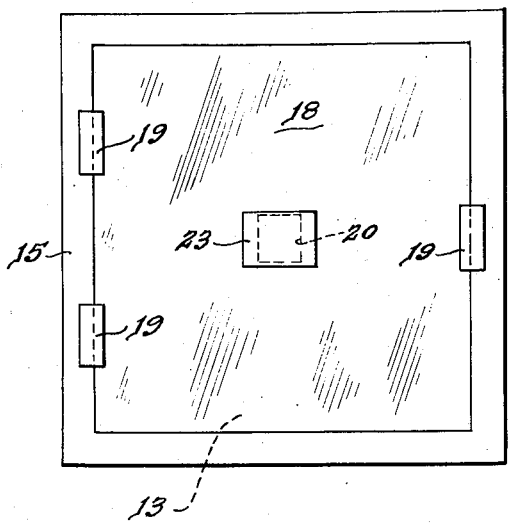
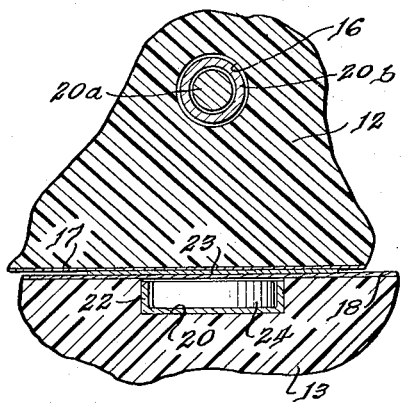
INVENTORS
Enrico Fermi
Herbert L. Anderson
BY Roland A. Anderson
Attorney United States Patent Office 2,969,307
Patented Jan. 24, 1961

2,969,307
METHOD OF TESTING THERMAL NEUTRON FISSIONABLE MATERIAL FOR PURITY

Enrico Fermi, Santa Fe, N. Mex., and Herbert L. Anderson, Hartford, Conn., assignors to the United States of America as represented by the United States Atomic Energy Commission Filed Nov. 21, 1945, Ser. No. 630,123

1 Claim. (Cl. 204—154.2)

This invention relates to a novel method of testing the neutronic purity of uranium or other material to be used in a neutronic reactor.

In neutronic reactors a neutron fissionable isotope such as $U^{233}$, $U^{235}$, or $94^{239}$ or mixtures thereof is subjected to fission by absorption of neutrons, and a self-sustaining chain reaction is established by the neutrons evolved by the fission. In general such reactors comprise bodies of compositions containing such fissionable material, for example, natural uranium, disposed in a material that slows the neutrons to thermal energies. Such a material is termed a neutron moderator. Carbon and $D_2O$ (heavy water) are typical moderators suitable for such use. Heat is evolved during the reaction which is removed by passage of a coolant through the reactor in heat exchange relationship therewith. Specific details of the theory and essential characteristics of such reactors are set forth in copending application of Enrico Fermi and Leo Szilard, Serial No. 568,904, filed Dec. 19, 1944, now Patent 2,708,656, dated May 17, 1955.

It has been found that certain impurities or neutron absorbers, which do not take part in the reaction involving fission of an isotope and formation of a fissionable isotope, exert a marked depressing action upon the neutron chain reaction. Unless the amount of such absorbers is controlled within proper limits, a self-sustaining reaction cannot be maintained. Where a material such as natural uranium is used to establish the reaction even very small amounts of certain impurities or absorbers will prevent maintenance of the reaction. Furthermore, they are specific to natural uranium and will vary with a change in the fissionable material used in the pile.

It is an object of the invention to provide a novel method of determining the neutronic purity of material, such as uranium, to be used in a neutronic reactor. Neutronic purity, as hereinafter more fully discussed, has no necessary connection with chemical purity, i.e., a composition having high neutronic purity is one which is substantially free from particular elements having relatively great neutron capture cross-sections.

An initial number of fast neutrons in the system, by going through the process of absorption and fission, produce in the next generation a number of neutrons generally different from the initial number. The ratio of the number produced after one generation to the initial number for a system of infinite size is called the reproduction or multiplication factor of the system and is denoted by the symbol K.

For any finite system, some neutrons will escape from the periphery of the system. Consequently a system of finite size may be said to have a K constant, even though the value thereof would only exist if the system as built were extended to infinity without change of geometry or materials. Thus when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, then a self-sustaining chain reacting system of finite and practical size can be built to produce power and related byproducts by nuclear fission of natural uranium. The neutron reproduction ratio in a system of finite size, therefore, differs from K by the external leakage factor, and by a factor due to the neutron absorption by localized neutron absorber, and the reproduction ratio must still be sufficiently greater than unity to permit the neutron density to rise exponentially with time in the system as built.

During the interchange of neutrons in a system of finite size, comprising bodies of any size disposed in a neutron moderator, neutrons may be lost to the chain reaction in four ways:

(1) By absorption or capture in the uranium content of the bodies without producing fission, (2) By absorption or capture in the moderator material itself, (3) By leakage out of the system through the periphery thereof, and (4) By absorption or capture by the impurities present in both the uranium bodies and the moderator.

However, even when the first three above-mentioned losses are reduced to a practical minimum, no self-sustaining chain reaction can be obtained in any system unless impurities in the material used for the reaction are reduced to such an extent that the loss by parasitic capture by such impurities will not prevent the reaction from becoming self-sustaining. Impurities present in both the uranium and the moderator consequently constitute a very important neutron loss factor in the chain. The effectiveness of various elements as neutron absorbers varies tremendously.

Certain elements such as boron, cadmium, samarium, gadolinium, and some others, if present even in a few parts per million, could very likely prevent a self-sustaining chain reaction from taking place. It is highly important, therefore, to remove as far as possible all impurities capturing neutrons to the detriment of the chain reaction from both the slowing material and the uranium. If these impurities are present in too great quantity, the self-sustaining chain reaction cannot be attained. The permissible amounts of impurities will vary for each specific geometry, depending upon such considerations as the form in which the uranium is used—that is, whether natural or enriched, whether as metal or oxide. The type of slowing-down material used, for example, whether deuterium, graphite, or beryllium, also influences the effect of impurities, as do the weight ratios between the uranium and the slowing-down material.

The effect of impurities on the optimum reproduction factor K may be conveniently evaluated by means of certain constants known as "danger coefficients" which are assigned to the various elements. These danger coefficients for the impurities are each multiplied by the fraction by weight of the corresponding impurity, with respect to the weight of uranium in the system; and the total sum of these coefficients gives a value known as the total danger sum. This total danger sum is subtracted from the reproduction factor K as calculated for pure materials under consideration.

The danger coefficients are defined in terms of the ratio of the weight of impurity per unit mass of uranium and are based on the cross-section for absorption of neutrons of the various elements. These values may be obtained from published literature on the subject such as Physikalische Zeitschrift, vol. 43, p. 440 (1942), or Zeitschrift für Physik, vol. 121, p. 201 (1943), and the danger coefficient computed by the formula $$\frac{T_i A_u}{T_u A_i}$$

wherein $T_i$ represents the cross section for the impurity and $T_u$ the cross section for the uranium, $A_i$ the atomic weight of the impurity and $A_u$ the atomic weight for uranium. In general, whether the impurities are in the moderator or in the uranium, they may be computed as their fraction by the weight of the uranium in the system and the result will be sufficiently accurate for design purposes.

The approximate danger coefficients for some elements in a natural uranium system are given in the following table, wherein the elements are listed in order of their atomic number:

| Element | Danger Coefficient | Element | Danger Coefficient |
|---|---|---|---|
| Li | 310 | Ni | 3 |
| B | 2,150 | Cu | 1.8 |
| C | 0.012 | Zn | .61 |
| N | 4.0 | Ga | ~1 |
| O | 0.002 | As | 2 |
| F | .02 | Se | 6.3 |
| Ne | 3 | Br | 2.5 |
| Na | .65 | Ag | 18 |
| Mg | .48 | Cd | 870 |
| Al | .30 | In | 54.2 |
| Si | .26 | Sn | .18 |
| P | .3 | Sb | 1.6 |
| S | .46 | I | 1.6 |
| Cl | 31 | Ba | 0.3 |
| A | 0.8 | Sm | ~1,430 |
| K | 2.1 | Eu | ~435 |
| Ca | .37 | Gd | ~6,320 |
| Ti | 3.8 | Pb | .03 |
| V | 4 | Bi | 0.0025 |
| Cr | 2 | Th | 1.1 |
| Mn | 7.5 | Te | 0.5 |
| Fe | 1.5 | Hg | 82 |
| Co | 17 | Au | 16 |
|  |  | Px | ~2.5 |
|  |  | Ir | ~70 |
|  |  | Ta | 2.7 |
|  |  | W | ~18 |
|  |  | Dy | ~200 |

The sum of the danger coefficients of the impurities in any given composition entering into a reactor as multiplied by the fraction by weight of the uranium in the reactor is known as total danger sum of the composition. This figure is a dimensionless constant like K and accordingly can be directly subtracted from K. It will be noted that the danger coefficients given are related to the neutron danger coefficient of unity for uranium.

As a specific example, if the materials of a system under consideration have 0.01 percent by weight of each of the elements N, Co, and Ag with respect to the weight of the uranium in the system, the total danger sum in K units for such an analysis would be:

$$.0001 \times 4 + .0001 \times 17 + .0001 \times 18 = .0039$$

This figure can then be subtracted from the K calculated for theoretically pure materials to give the actual K factor for the geometry and material used. This would be a rather unimportant reduction in the reproduction factor K unless the reproduction factor K for a given geometry and materials without considering impurities, is very nearly unity. If, on the other hand, the impurities in the uranium are Li, Co, and Ag in the same percentage, the total danger sum would be:

$$.0310 + .0017 + .0018 = .0345 \text{ reduction in K due to impurities.}$$

The maximum possible K factors for natural-uranium neutronic reaction systems when optimum geometry is used and where the materials used are assumed to be theoretically pure, have been calculated as follows:

| Materials | K for Pure Materials |
|---|---|
| U metal—graphite moderator | 1.1 |
| U oxide—graphite moderator | 1.07 |
| U metal—beryllium moderator | 1.18 |
| U metal—beryllium oxide moderator | 1.09 |
| U metal—heavy water moderator | 1.3 |

It can be readily seen from the above tabulation that the total danger sum for impurities in both the uranium and moderator must be less than .3 in order that the K factor remain equal to or greater than unity with a moderator having a minimum absorption of neutrons, a deuterium moderator, less than .09 for a beryllium oxide moderator, and less than .1 for a graphite moderator. Even when neutron losses due to moderator and leakage have been substantially eliminated, the danger sum of the impurities or absorbers in the natural uranium can not exceed about 0.3.

The present invention comprehends a very practical method of testing material, such as uranium, said method being known as the "shotgun" test. In this test a thin neutron detector, e.g., a piece of indium foil, placed near a neutron source inside a block of paraffin is made radioactive by an amount proportional to the density of thermal neutrons at the foil and the time of exposure. This radioactivity can be measured. A neutron absorbing pellet such as one of a standard amount of boron, when placed close to the detector foil, decreases the thermal-neutron density in the neighborhood of the foil and lowers the induced radioactivity of the detector foil. By replacing the standard boron absorbing pellet with a pellet containing the impurities from a known amount of uranium composition to be tested, and again measuring the radioactivity of the neutron detector, a direct comparison is obtained between the absorption caused by the unknown composition and the standard boron absorber. From this comparison the danger sum of the impurities in the uranium composition can be calculated in terms of boron equivalent. From the danger coefficient of boron the K reduction can be calculated.

One suitable means for carrying out the "shotgun" test is described below, although such means is not part of the present invention. It is also illustrated in the accompanying drawing, wherein Figure 1 is a cross-sectional view of the apparatus during measurement of the radioactivity on an indium foil without a pellet; Figure 2 is a top view of the lower box along line 2—2 of Figure 1; Figure 3 is an enlarged view of the apparatus along line 3—3 of Figure 1 after insertion of the pellet of uranium impurities; and Figure 4 is a cross-sectional view of the apparatus like that of Figure 3 after insertion of a standard boron pellet.

A block 10 of paraffin 30 cm. on each side is molded in a wooden box 11. The box and the paraffin box are cut in halves 12, 13 and 14, 15, respectively, horizontally so that each half of the paraffin remains in its own portion of the box. A hole 16 is formed through one side of the upper box half and into the paraffin 3 cm. above and parallel to the lower surface of the paraffin; this hole 16 extends into the center of the paraffin. The adjacent paraffin surfaces of the block halves are covered, the upper with onion skin paper 17, the lower with celloplane 18 linked at the back with Scotch tape 19 (Figure 2) to permit lifting for access to the paraffin surface. The upper half of the box is supported so that it can be readily moved up and down, and the lower half of the box is supported so that it can slide in and out like a drawer when the upper half is up. A small square hole 20 is cut in the center of the upper surface of the lower block of paraffin a little more than 3/16 of an inch deep.

It is known that 3 cm. of paraffin will slow down the neutrons evolved from a radium-beryllium source to slow or thermal speeds. A radium-beryllium source 20a consisting of 200.5 mg. of radium and 0.6 gm. of beryllium emitting about $2 \times 10^6$ neutrons per second may be used as the source. This source is contained in a brass capsule 20b at the end of a long handle 20c.

In order to make a measurement, the composition to be measured is formed into a pellet 21 of predetermined size and shape by hydraulic pressure. This pellet 21 is placed in an aluminum container 22 which just fits the square hole 20 in the upper surface of the lower half 15 of the paraffin block 13 and a piece of indium foil 23 is placed carefully over the aluminum container 22 on the surface of the lower paraffin block 13. The lower block 13 is then put in place and the upper block 12 is lowered on top of it. The radium-beryllium source 20a is then inserted all the way into the hole 16 in the upper block, and exact notations are made of the time. The irradiation is allowed to continue for a set time, usually 15 minutes. It is important that the time be measured accurately and preferably should be the same for all comparable tests.

Preferably, exactly 15 minutes after starting the irradiation, the source is removed. The upper paraffin block 12 is lifted, the lower paraffin block 13 is slid out, and the indium foil 23 is removed. The foil is then wrapped around the tube of a Geiger-Müller counter (not shown), and preferably exactly 3 minutes after the end of the irradiation counting is begun and continued for exactly 21 minutes.

The counting is preferably started exactly 3 minutes after the end of the irradiation in order to allow the short-lived radiation of the indium, which has a half-life of 13 seconds, to substantially disappear, although mathematical correction can be made, if the time element of either irradiation or counting is charted.

It is important that every precaution be taken to avoid contamination of the foil 23 or Geiger-Müller counter with UX or other foreign substances. Every precaution must be taken to obtain strict cleanliness and to repeat each test in exactly the same way, so as to make all measurements comparable. The details of technique necessary to obtain these results will be obvious to those skilled in the art.

In order to use the "shotgun" test so as to determine the neutronic purity of uranium to be used in a neutronic reactor, a practical procedure is to take a representative sample of material having a 10 kg. uranium content after large-scale purification as by the methods disclosed in the parent case. The sample is submitted to an additional extremely exhaustive purification on a laboratory scale. In this way, practically all of the impurities left in the uranium composition to be tested can be removed and the impurities are removed, recovered, and formed into pellet 21 (Figure 3). The sample pellet is then compared with the absorption of the standard boron pellet 24 (Figure 4) in the apparatus described.

The results of the "shotgun" test are usually reported as percent absorption which is equal to $$\frac{\text{Absorption of impurities expressed in equivalent milligrams of boron}}{\text{Absorption of 10 kilograms of uranium expressed in equivalent milligrams of boron}}$$

The absorption of 10 kilograms of uranium in terms of boron can be readily calculated from the danger coefficients given above as equal to 4,560 milligrams of boron.

As shown in the derivation given below, the percent absorption from the "shotgun" test is in approximately the same terms as the K factor for a neutronic reactor. It has been found that this approximation is very close and is sufficiently accurate for a practical and periodic check on uranium compositions produced on a large scale for use in an operating neutronic reactor.

In a neutronic reactor:

$$K = f \cdot n \cdot E \cdot P$$

where $f$ = thermal utilization, or the fraction of neutrons absorbed in the uranium.
$P$ = probability of a fast neutron escaping resonance capture.
$E$ = No. of fast neutrons produced by fast fission per fast neutron produced by thermal fission.
$n$ = No. of fast neutrons produced by thermal fission per thermal neutron absorbed.

$$\frac{\Delta K}{K} = \frac{n \cdot E \cdot P \cdot f}{n \cdot E \cdot P f} = \frac{\Delta f}{f}$$

where $\Delta$ indicates a small increment in the associated term.

$$\frac{\Delta K}{K} = \frac{f_1 - f_2}{f_1}$$

where $$f_1 = \frac{\text{neutrons absorbed in uranium}}{\text{neutrons absorbed in U and moderator}}$$

$$f_1 = \frac{N_o G a_o}{N_o G a_o + N G a_m}$$

$$f_2 = \frac{\text{neutrons absorbed in uranium}}{\text{neutrons absorbed in U, moderator and impurities}}$$

$$f_2 = \frac{N_o G a_o}{N_o G a_o N_m G_{am} N_i G_{ai}}$$

where $N_o$, $N_m$, $N_i$ = average number of atoms per cc. for the uranium, the moderator, and the impurities in the uranium, respectively, and $Ga_o$, $Ga_m$, $Ga_i$ = absorption cross sections for the uranium, the moderator, and the impurities in the uranium (considered as one impurity) substituting $$\frac{\Delta K}{K} = \frac{\dfrac{N_o G a_o}{N_o G a_o N_m G a_m} - \dfrac{N_o G a_o}{N_o G a_o N_m G a_m N_i G a_i}}{\dfrac{N_o G a_o}{N_o G a_o + N_m G a_m}}$$

$$= \frac{N_i G a_i}{N_o G a_o + N_m G a_m + N_i \cdot G a_i}$$

Fractional absorption (shotgun test)

$$= \frac{\text{absorption of impurities}}{\text{absorption of uranium}} = \frac{n.v.N_i G a_i}{n v N_o G a_o}$$

where $n$ = No. of neutrons per cc.
$v$ = velocity (cm./5 sec.)

$$\text{Fractional absorption} = \frac{N_i G a_i}{N_o G a_o}$$

As a close approximation, the absorption in the moderator and in impurities may be ignored as compared to the absorption in the uranium, i.e., $N_m Ga_m$ and $N_i Ga_i$ may be considered negligible.

Then $$\frac{\Delta K}{K} = \frac{N_i G a_i}{N_o G a_o}$$

But $$\text{Fractional absorption (shotgun test)} = \frac{N_i G a_i}{N_o G a_o}$$

Therefore, as a close approximation, fractional absorption from shotgun test $= \Delta K$, provided K is approximately unity.

While the theory of nuclear reactions set forth herein is based on the best presently known experimental evidence, the invention is not limited thereto, as additional experimental data later discovered may modify the theory disclosed.

Obviously, many modifications may be made in the specific embodiments disclosed without departing from the intended scope of the invention.

What is claimed is:

A method of testing the neutronic purity of a thermal neutron fissionable material sample comprising the steps of producing a neutron flux field, inserting a standard neutron absorber of known characteristics and amount in said field, extracting substantially all of the chemical impurities from said sample, replacing said standard absorber with all of the impurities from the sample of the fissionable material, and producing successive indications of the neutron intensity by bombardment of a neutron detector foil placed at a region of said field with both the absorber and the impurity sample removed, with the absorber present and the impurity sample removed, and with the absorber removed and the impurity sample present, whereby the neutronic purity of the sample may be calculated from said indications.

References Cited in the file of this patent

UNITED STATES PATENTS

| 1,471,514 | Elliot | Oct. 23, 1923 |
| 2,288,717 | Kallmann et al. | July 7, 1942 |
| 2,288,718 | Kallmann et al. | July 7, 1942 |

OTHER REFERENCES

Burger et al.: "Determination of Hydrogen Content by Slow-Neutron Scattering," AECD-2319, U.S.A.E.C., 9 pages, date of manuscript, October 21, 1943; date declassified, September 22, 1948. (Copy in Patent Office Library.)

Booth et al.: Phy. Rev. 57, 748 (1940). (Copy in Patent Office Library.)

Phy. Rev. 55, 511–512 (1939). (Copy in Patent Office Library.)

Kennedy et al.: "Component Analysis of Small Uranium Samples," MDDC-973, USAEC, date of manuscript, March 26, 1943, date declassified, May 23, 1947.

Naturwissenschaften, vol. 27, 1939, pages 402–410. (Copy in Division 56 of the Patent Office.)

Physical Review, March 15, 1940, page 546. (Copy in the Patent Office Library.)